(12) United States Patent
Sun et al.

(10) Patent No.: US 10,885,876 B2
(45) Date of Patent: Jan. 5, 2021

(54) METHOD AND DEVICE FOR ADJUSTING BRIGHTNESS, DISPLAY DEVICE AND STORAGE MEDIUM

(71) Applicants: Beijing BOE Optoelectronics Technology Co., Ltd., Beijing (CN); BOE Technology Group Co., Ltd., Beijing (CN)

(72) Inventors: Jian Sun, Beijing (CN); Ziqiang Guo, Beijing (CN); Zhen Tang, Beijing (CN); Lin Lin, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/480,445

(22) PCT Filed: Nov. 8, 2018

(86) PCT No.: PCT/CN2018/114553
§ 371 (c)(1),
(2) Date: Jul. 24, 2019

(87) PCT Pub. No.: WO2019/200896
PCT Pub. Date: Oct. 24, 2019

(65) Prior Publication Data
US 2020/0175944 A1    Jun. 4, 2020

(30) Foreign Application Priority Data

Apr. 20, 2018  (CN) .......................... 2018 1 0362454

(51) Int. Cl.
*G09G 5/10*  (2006.01)
*G06F 3/01*  (2006.01)

(52) U.S. Cl.
CPC ............... *G09G 5/10* (2013.01); *G06F 3/013* (2013.01); *G09G 2320/0626* (2013.01); *G09G 2354/00* (2013.01)

(58) Field of Classification Search
CPC ............ G06F 3/013; G09G 2320/0626; G09G 2354/00; G09G 5/10
See application file for complete search history.

(56) References Cited

U.S. PATENT DOCUMENTS

| 7,038,651 | B2 | 5/2006 | Nitta et al. |
| 7,352,350 | B2 | 4/2008 | Nitta et al. |

(Continued)

FOREIGN PATENT DOCUMENTS

| CN | 1455382 A | 11/2003 |
| CN | 101365273 A | 2/2009 |

(Continued)

OTHER PUBLICATIONS

First Office Action, including Search Report, for Chinese Patent Application No. 201810362454.1, dated Jul. 26, 2019, 19 pages.

*Primary Examiner* — Dmitriy Bolotin
(74) *Attorney, Agent, or Firm* — Westman, Champlin & Koehler, P.A.

(57) ABSTRACT

Embodiments of the present disclosure provide a method for adjusting backlight for a display device, a device for adjusting backlight, a computing device, a display device, and a storage medium. The method includes: acquiring a displayed image of the display device; acquiring a gazed point of a user on the displayed image; determining a gazed area and an un-gazed area for a displayed image according to the gazed point; adjusting a brightness of the backlight for the gazed area with a first precision; and adjusting the brightness of the backlight for the un-gazed area with a second precision.

11 Claims, 3 Drawing Sheets

(56) References Cited

U.S. PATENT DOCUMENTS

| | | | |
|---|---|---|---|
| 8,106,879 B2 | 1/2012 | Huang | |
| 9,570,016 B2 | 2/2017 | Meng et al. | |
| 10,380,950 B2 | 8/2019 | Chang | |
| 2003/0179221 A1 | 9/2003 | Nitta et al. | |
| 2006/0176261 A1 | 8/2006 | Nitta et al. | |
| 2008/0238860 A1 | 10/2008 | Onodera | |
| 2009/0039801 A1 | 2/2009 | Huang | |
| 2011/0316902 A1* | 12/2011 | Onishi | H04N 21/44008 345/690 |
| 2012/0288139 A1* | 11/2012 | Singhar | G06F 1/3265 382/103 |
| 2013/0021308 A1 | 1/2013 | Ge | |
| 2014/0247232 A1* | 9/2014 | George-Svahn | G06F 3/013 345/173 |
| 2015/0235597 A1 | 8/2015 | Meng et al. | |
| 2017/0193927 A1* | 7/2017 | Yang | G09G 3/3426 |
| 2017/0293352 A1* | 10/2017 | Todeschini | G06F 3/04842 |
| 2018/0053479 A1* | 2/2018 | Lin | G09G 3/3648 |
| 2018/0090078 A1 | 3/2018 | Chang | |
| 2018/0210548 A1* | 7/2018 | Sato | G06F 3/04883 |
| 2019/0138092 A1* | 5/2019 | Song | G06T 7/11 |

FOREIGN PATENT DOCUMENTS

| | | |
|---|---|---|
| CN | 101676982 A | 3/2010 |
| CN | 103854613 A | 6/2014 |
| CN | 104484043 A | 4/2015 |
| CN | 104811532 A | 7/2015 |
| CN | 105513521 A | 4/2016 |
| CN | 106531123 A | 3/2017 |
| CN | 107870425 A | 4/2018 |
| CN | 108520728 A | 9/2018 |

\* cited by examiner

METHOD AND DEVICE FOR ADJUSTING BRIGHTNESS, DISPLAY DEVICE AND STORAGE MEDIUM

CROSS-REFERENCE TO RELATED APPLICATION(S)

This application is a Section 371 National Stage Application of International Application No. PCT/CN2018/114553, filed 8 Nov. 2018, which claims the priority of Chinese Patent Application No. 201810362454.1, filed on Apr. 20, 2018, the entire contents of which are hereby incorporated by reference.

TECHNICAL FIELD

The present disclosure relates to the field of display technology. In particular, the present disclosure relates to a method for adjusting brightness, a device for adjusting brightness, a display device, and a storage medium.

BACKGROUND

In a backlight brightness adjustment technology, the backlight adjustment is only performed on a backlight partition corresponding to a gazed area of a user on a displayed image, and the backlight partition corresponding to an un-gazed area is poorly adjusted. However, the brightness characteristics of the un-gazed area can affect the user's viewing experience.

SUMMARY

According to an aspect of embodiments of the disclosure, there is provided a method for adjusting backlight of a display device, comprising:
  acquiring a displayed image of the display device;
  acquiring a gazed point of a user on the displayed image;
  determining a gazed area and an un-gazed area for the displayed image according to the gazed point;
  adjusting a brightness of the backlight for the gazed area with a first precision; and
  adjusting the brightness of the backlight for the un-gazed area with a second precision.

For example, the method may further comprise: acquiring the un-gazed point by an eye tracking algorithm or a gaze tracking algorithm dynamically.

For another example, acquiring the gazed point of the user on the displayed image may comprise: determining whether the gazed point of the user on the displayed image is acquired or not; and determining the gazed area and the un-gazed area for the displayed image according to a preset position on the displayed image, in response to determining that the gazed point is not acquired.

For another example, acquiring the gazed point of the user on the displayed image may comprise: determining whether the gazed point of the user on the displayed image is acquired or not; and treating the displayed image as the gazed area, in response to determining that the gazed point is not acquired.

For another example, the display device may comprise a backlight apparatus comprising a plurality of backlight elements, and adjusting the brightness of the backlight for the gazed area with the first precision comprises:
  scanning at least one backlight element for the gazed area among the plurality of backlight elements in a set direction; and
  adjusting a current value applied to at least one backlight element for the gazed area with the first precision, and
  wherein adjusting the brightness of the backlight for the un-gazed area with the second precision comprises:
  scanning at least one backlight element for the un-gazed area among the plurality of backlight elements in the set direction; and
  adjusting the current value applied to at least one backlight element for the un-gazed area with the second precision.

For another example, adjusting the current value applied to at least one backlight element for the gazed area with the first precision comprises: adjusting, for each of the at least one backlight element for the gazed area, a register value corresponding to the backlight element stored in a first cascaded register, and outputting an adjusted register value.

For another example, adjusting the current value applied to at least one backlight element for the un-gazed area with the second precision comprises: adjusting, for each of the at least one backlight element for the un-gazed area, the register value corresponding to the backlight element stored in a second cascaded register, and outputting an adjusted register value.

Among others, a number of base registers in the first cascaded register is greater than the number of base registers in the second cascaded register.

For another example, the method may further comprise:
  cascading a first number of base registers to form the first cascaded register according to a preset maximum cascading number, a bit width, and an actual cascading number of the base registers, in response to an actual cascading number of the base registers being the first number; and
  cascading a second number of base registers to form the second cascaded register according to a preset maximum cascading number, a bit width, and the actual cascading number of the base registers, in response to the actual cascading number of the base registers being the second number.

For another example, the method may further comprise:
  setting a first flag to a first status, in response to the gazed point being acquired; and
  performing, in response to the first flag being changed from the first status to a second status, a sequential traversal scanning on the at least one backlight element for the un-gazed area previous the gazed area in terms of position, until a second flag is set to the first status;
  performing, in response to the second flag being set to the first status, the sequential traversal scanning on the at least one backlight element for the gazed area, until the second flag is changed from the first status to the second status; and
  performing, in response to the second flag being changed from the first status to the second status, the sequential traversal scanning on the at least one backlight element for the un-gazed area behind the gazed area in terms of position, until a third flag is set to the first status.

For another example, the method may further comprise:
  controlling, in response to the first flag being changed from the first status to the second status, a first counter to count until a count value of the first counter reaches a first threshold, and setting the second flag to the first status;
  controlling, in response to the second flag being set to the first status, a second counter to count until a count value of the second counter reaches a second threshold, and changing the second flag from the first status to the second status; and
  controlling, in response to the second flag being changed from the first status to the second status, a third counter to count until a count value of the third counter reaches a third threshold, and setting the third flag to the first status.

According to another aspect of the disclosure, there is provided a device for adjusting backlight of a display device, comprising:

an acquisition unit, configured to acquire a displayed image of the display device and a gazed point of a user on the displayed image;

an area determining unit, configured to determine a gazed area and an un-gazed area for the displayed image according to the gazed point; and a brightness adjustment unit, configured to adjust a brightness of the backlight for the gazed area with a first precision, and adjust the brightness of the backlight for the un-gazed area with a second precision.

For example, the display device comprises a backlight apparatus comprising a plurality of backlight elements, the backlight adjustment unit is further configured to:

scan at least one backlight element for the gazed area and at least one backlight element for the un-gazed area among the plurality of backlight elements in a set direction respectively;

adjust a current value applied to the at least one backlight element for the gazed area with the first precision, in response to the gazed area being scanned, and adjust a current value applied to the at least one backlight element for the un-gazed area with the second precision, in response to the un-gazed area being scanned.

For another example, the backlight adjustment unit is further configured to: set a first flag to a first status, in response to the gazed point being acquired; perform, in response to the first flag being changed from the first status to a second status, a sequential traversal scanning on the at least one backlight element for the un-gazed area previous the gazed area in terms of position, until a second flag is set to the first status; perform, in response to the second flag being set to the first status, the sequential traversal scanning on the at least one backlight element for the gazed area, until the second flag is changed from the first status to the second status; and perform, in response to the second flag being changed from the first status to the second status, the sequential traversal scanning on the at least one backlight element for the un-gazed area behind the gazed area in terms of position, until a third flag is set to the first status.

According to yet another aspect of the disclosure, there is provided a backlight adjustment computing device, comprising:

a memory, configured to store computer executable instructions; and at least one processor, configured to execute the computer executable instructions so as to perform steps of the method for adjusting backlight of any of embodiments of the disclosure.

According to still another aspect of the disclosure, there is provided a display device comprising a display apparatus, a backlight apparatus, and a backlight adjustment computing device of embodiments of the disclosure, which are electrically coupled.

For example, the backlight apparatus comprises a plurality of backlight elements, wherein at least a portion of the plurality of backlight elements are disposed at an edge area of the backlight apparatus.

According to another aspect of the disclosure, there is provided a computer readable storage medium storing a computer program, the computer program being executed to implement the method for adjusting backlight of any of embodiments of the disclosure.

BRIEF DESCRIPTION OF THE DRAWINGS

The above and/or additional aspects and advantages of the present disclosure will become apparent and readily understood from following description in combination with the drawings, in which.

DETAILED DESCRIPTION

Figure 1:
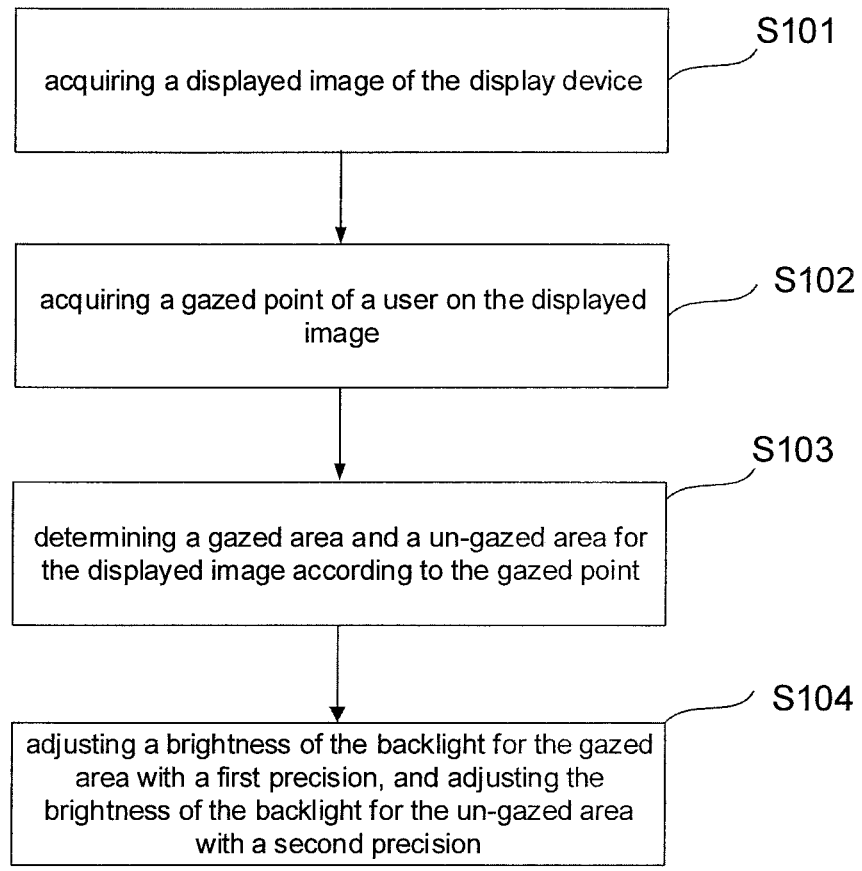
FIG. 1 shows a schematic flow chart illustrating a method for adjusting backlight according to an embodiment of the present disclosure.

It is found by the inventor of the present disclosure that an entire backlight area can be divided into m×n (m and n are positive integers) independent backlight partitions, wherein each of the backlight partitions corresponds to one or several LEDs (Light-Emitting Diode). Each backlight partition can be separately controlled and adjusted as a minimum adjustment unit (or referred to as a backlight element).

It is assumed that Aij refers to the brightness of the backlight element, wherein i indicates for the number of rows, $1<<i<<m$; and j indicates for the number of columns, $1<<j<<n$. Thus, Aij represents the brightness of the backlight element in the $i^{th}$ row and the $j^{th}$ column of the backlight area, and Aij may have a value which can be adjusted according to an actual demand of a user on the brightness of a displayed image. Accordingly, the entire backlight area can be represented by the following brightness matrix (hereinafter referred to as "first matrix"):

$$\begin{bmatrix} A11 & A12 & \cdots & \cdots & A1n \\ A21 & A22 & \cdots & \cdots & A2n \\ \vdots & \vdots & \ddots & & \vdots \\ \vdots & \vdots & & \ddots & \vdots \\ Am_11 & Am_12 & \cdots & \cdots & Am_1n \\ A(m_1+1)1 & A(m_1+1)2 & \cdots & \cdots & A(m_1+1)n \\ A(m_1+2)1 & A(m_1+2)2 & \cdots & \cdots & A(m_1+2)n \\ \vdots & \vdots & \ddots & & \vdots \\ \vdots & \vdots & & \ddots & \vdots \\ A(m_1+m_2)1 & A(m_1+m_2)2 & \cdots & \cdots & A(m_1+m_2)n \\ A(m_1+m_2+1)1 & A(m_1+m_2+1)2 & \cdots & \cdots & A(m_1+m_2+1)n \\ A(m_1+m_2+2)1 & A(m_1+m_2+2)2 & \cdots & \cdots & A(m_1+m_2+2)n \\ \vdots & \vdots & \ddots & & \vdots \\ \vdots & \vdots & & \ddots & \vdots \\ A(m_1+m_2+m_3)1 & A(m_1+m_2+m_3)2 & \cdots & \cdots & A(m_1+m_2+m_3)n \end{bmatrix}$$

wherein $m=m_1+m_2+m_3$.

In a backlight processing for the displayed image, backlight processing is performed only on a gazed area (a core area of human eye observation) in the display image, wherein the gazed area is usually fixed. Taking the image corresponding to the above brightness matrix as an example, the gazed area may be a rectangular area formed by the $(m1+1)^{th}$ to the $(m1+m2)^{th}$ rows and the first to $n^{th}$ columns. Therefore, the adjustment is usually performed on the gazed area.

In actual use, the user's gaze is being changed frequently, resulting in a dynamic change in the gazed area. Therefore, it is necessary to perform backlight adjustment processing for a changing gazed area.

In addition, when the display device is applied to a VR (Virtual Reality) or AR (Augmented Reality) system, an introduction of lens may cause distortion. The distortion is particularly serious in an edge area of the displayed image. As the magnification of the lens is larger, the distortion will be more severe.

Embodiments of the present disclosure may provide a method for adjusting backlight, a device for adjusting backlight, a display device, and a storage medium. The embodiments of the present disclosure may not only enable adjusting the brightness of the backlight for an un-gazed area, but also enable a finer adjustment for the brightness of the backlight for the dynamically changing gazed area. Meanwhile, it is also possible to reduce the distortion.

The embodiments of the present disclosure are described in detail below. Examples of the embodiments are illustrated in the drawings, wherein the same or similar reference numerals are used to refer to the same or similar elements or elements having the same or similar functions. The embodiments described below with reference to the accompanying drawings are intended to be illustrative only, and are not to be construed as limiting.

Those skilled in the art should be understood that the singular forms "a", "an", "the" can also include plural, unless otherwise defined. It should be further understood that the phrase "comprise" or "comprises" represents a presence of a listed characteristic, an integer, a step, an operation, an element and/or a component, but not exclude the presence or addition of one or more other characteristics, integers, steps, operations, elements, components and/or a combination thereof. It will be understood that when an element is referred to as being "connected" or "coupled" to another element, it can be directly connected or coupled to the other element, or there may be an intermediary element. Further, "connected" or "coupled" as used herein may include either a wireless connection or a wireless connection. The phrase "and/or" used herein includes all or any of one or more associated listed items and all combinations thereof.

Those skilled in the art will appreciate that all terms (including technical and scientific terms) used herein have the same meaning as commonly understood by those skilled in the art to which the disclosure belongs, unless otherwise defined.

Embodiments of the present disclosure provide a method for adjusting backlight of a display device. As shown in FIG. 1, the method for adjusting backlight according to the embodiment of the present disclosure may include following steps.

In S101, a displayed image for the display device is acquired.

In S102, a gazed point of a user on the displayed image is acquired.

In S103, a gazed area and an un-gazed area are determined for a displayed image according to the gazed point.

For example, an eye tracking algorithm or a gaze tracking algorithm may be used to dynamically acquire the gazed point and calculate the coordinates (x, y) of the gazed point in the displayed image. By determining the gazed point dynamically, the acquired gazed point can be more accurate.

For example, based on the coordinates (x, y) of the determined gazed point, an area radius can be determined by taking the coordinates (x, y) of the gazed point as a center, thereby obtaining the gazed area defined by the center and the area radius. Other display areas except for the gazed area may be un-gazed areas. The gazed area and the un-gazed area each have a plurality of backlight elements. There may be one or more un-gazed areas depending on the location of the gazed area.

For example, the area radius in each direction is the same value, so that the gazed area is a circular area having the center at the coordinates of the gazed point and the area radius of the same value.

For example, the area radius may include a first value a in the first direction and a second value $a_y$ in a second direction. Taking the above brightness matrix of the entire backlight area as an example, the first value a represents the distance between the row of the coordinate of the gazed point and the row of a boundary of the gazed area in the first direction, and the second value $\sigma_y$ represents the distance between the column of the coordinate of the gazed point and the column of a boundary of the gazed area in the second direction. At this time, the obtained gazed area is a rectangular area defined by the coordinates of the gazed point which is used as the area center, the boundary of the gazed area in the first direction and the boundary of the gazed area in the second direction. The boundary of the gazed area in the first direction may be determined according to the area center and the first value $\sigma_x$, and the boundary of the gazed area in the second direction may be determined according to the area center and the second value $\sigma_y$. The brightness matrix corresponding to the rectangular area (hereinafter referred to as "a second matrix") is as follows:

$$\begin{bmatrix} A(x-\sigma_x)(y-\sigma_y) & A(x-\sigma_x)[(y-\sigma_y)+1] & \ldots & A(x-\sigma_x)y & \ldots & A(x-\sigma_x)[(y+\sigma_y)-1] & A(x-\sigma_x)(y+\sigma_y) \\ A[(x-\sigma_x)+1](y-\sigma_y) & A[(x-\sigma_x)+1][(y-\sigma_y)+1] & \ldots & A[(x-\sigma_x)+1](y) & \ldots & A[(x-\sigma_x)+1][(y+\sigma_y)-1] & A[(x-\sigma_x)+1](y+\sigma_y) \\ \vdots & \vdots & & \vdots & & \vdots & \vdots \\ A(x-1)(y-\sigma_y) & A(x-1)[(y-\sigma_y)+1] & \ldots & A(x-1)(y) & \ldots & A(x-1)[(y+\sigma_y)-1] & A(x-1)(y+\sigma_y) \\ A(x)(y-\sigma_y) & A(x)[(y-\sigma_y)+1] & \ldots & A(x)(y) & \ldots & A(x)[(y+\sigma_y)-1] & A(x)(y+\sigma_y) \\ A(x+1)(y-\sigma_y) & A(x+1)[(y-\sigma_y)+1] & \ldots & A(x+1)(y) & \ldots & A(x+1)[(y+\sigma_y)-1] & A(x+1)(y+\sigma_y) \\ \vdots & \vdots & & \vdots & & \vdots & \vdots \\ A[(x+\sigma_x)-1](y-\sigma_y) & A[(x+\sigma_x)-1][(y-\sigma_y)+1] & \ldots & A[(x+\sigma_x)-1](y) & A[(x+\sigma_x)-1][(y+\sigma_y)-1] & A[(x+\sigma_x)-1](y+\sigma_y) \\ A(x+\sigma_x)(y-\sigma_y) & A(x+\sigma_x)[(y-\sigma_y)+1] & \ldots & A(x+\sigma_x)(y) & \ldots & A(x+\sigma_x)[(y+\sigma_y)-1] & A(x+\sigma_x)(y+\sigma_y) \end{bmatrix}$$

wherein x, y, $\sigma_x$ and $\sigma_y$ are all positive integers, wherein $1<<2\sigma_x+1<<m$ and $1<<2\sigma_y+1<<n$, that is, the gazed area does not go beyond the entire backlight area. Subsequent steps will be discussed by taking this case as an example.

Next, in step S104, the brightness of the backlight for the gazed area is adjusted with a first precision; and the brightness of the backlight for the un-gazed area is adjusted with a second precision.

For example, at least one backlight element for the gazed area and at least one backlight element for the un-gazed area are scanned in the set direction. A current value applied to the at least one backlight element for the gazed area is adjusted with the first precision, in response to the at least one backlight elements for the gazed area being scanned. A current value applied to the at least one backlight element for the un-gazed area is adjusted with the second precision, in response to the at least one backlight element for the un-gazed area being scanned.

According to an embodiment of the present disclosure, the at least one backlight element for the gazed area and the at least one backlight element for the un-gazed area may be scanned based on a flag.

For example, a first flag is set to a first status, in response to the gazed point being acquired; and in response to the first flag being changed from the first status to a second status, a sequential traversal scanning is performed on the at least one backlight element for the un-gazed area located previous the gazed area, until a second flag is set to the first status.

Those skilled in the art would understand that the first flag and the second flag may be a flag or any format that can represent the status, which are not limited herein. Further, those skilled in the art will also understand that, the expression of "in terms of position" may refer to that the displayed image is divided into m×n sub-display areas according to the backlight elements. For example, if it is determined that the sub-display area corresponding to the backlight elements from the $(m_1+1)^{th}$ row to the $(m_1+m_2)^{th}$ row in the first matrix is the gazed area, the sub-display area corresponding to the backlight elements from the first row to the $m_1^{th}$ row in the first matrix is the un-gazed area previous the gazed area, and the sub-display area corresponding to the backlight elements from the $(m_1+m_2+1)^{th}$ row to the $(m_1+m_2+m_3)^{th}$ (i.e. the $m^{th}$ row) row in the first matrix is the un-gazed area behind the gazed area.

Next, in response to the second flag being set to the first status, the sequential traversal scanning is performed on the backlight elements for the gazed area, until the second flag is changed from the first status to the second status;

In response to the second flag being changed from the first status to the second status, the sequential traversal scanning is performed on the backlight elements for the un-gazed area after the gazed area, until a third flag is set to the first status.

For example, in response to the first flag being changed from the first status to the second status, a first counter is controlled to count until a count value of the first counter reaches a first threshold, and the second flag is set to the first status. In response to the second flag being set to the first status, a second counter is controlled to count until a count value of the second counter reaches a second threshold, and the second flag is changed from the first status to the second status. In addition, in response to the second flag being changed from the first status to the second status, a third counter is controlled to count until a count value of the third counter reaches a third threshold, and the third flag is set to the first status.

For example, when the backlight element for a backlight partition is scanned, the brightness adjustment for that backlight area can be realized by adjusting the current value applied to the backlight element, thereby enable a finer brightness adjustment for various backlight partitions in a unit of backlight element.

For example, in response to each backlight element for the gazed area being scanned, a register value Reg_extension corresponding to the corresponding backlight element stored in a first cascaded register can be adjusted. Then, an adjusted register value Reg_extension_Adjusted can be outputted. According to an embodiment of the present disclosure, the adjusted register value Reg_extension_Adjusted may be used as the current value to be applied to the backlight element.

For example, according to an embodiment of the present disclosure, the first cascaded register can be formed in the following manner. When an actual cascading number of base registers is a first number, the first number of base registers is cascaded to form the first cascaded register according to a preset maximum cascading number, a bit width, and the actual cascading number of the base registers.?

For example, the preset maximum cascading number of the base registers can be defined as the variable "Nreg", wherein "Nreg" has an initial value as follows:

$$Nreg = m \times n + \{2 \times [\max(\sigma_x)] + 1\} \times \{2 \times [\max(\sigma_y)] + 1\} \quad (1)$$

In the above equation (1), $\sigma_x$ and $\sigma_y$ can be defined by a variable "define" and stored in a glbl.v file. The value of "define" can be assigned according to factors such as application scenarios, image preprocessing, raw data (Raw Data) and the like.

For example, the preset base bit width of the base register is defined as a variable "Wreg" and stored in the glbl.v file. The value of "Wreg" can be 4, 8, 12 or 16 bits, and the specific value depends on requirements on the precision in the actual adjustment.

For example, the actual cascading number of the base registers is defined as a variable "k" and stored in the glbl.v file, and the specific value of k is determined according to the requirements on the precision in the actual adjustment.

In the embodiment of the present disclosure, the first precision may be $2^{(k \times Wreg)}$.

For example, in response to the backlight element for the un-gazed area being scanned, the register value Reg_base corresponding to the backlight element stored in a second cascaded register is adjusted. Then, an adjusted register value Reg_base_Adjusted may be outputted. According to an embodiment of the present disclosure, the adjusted register value Reg_base_Adjusted may be used as the current value to be applied to the backlight element for the un-gazed area.

For example, according to an embodiment of the present disclosure, the second cascaded register can be formed in the following manner. When an actual cascading number of base registers is a second number, the second number of base registers is cascaded to form the second cascaded register according to a preset maximum cascading number, a bit width, and the second number of the base registers.

For example, the preset maximum cascading number of the base registers can be defined as the variable "Nreg", and the initial value of "Nreg" is set according to the above equation (1).

In the equation (1), $\sigma_x$ and $\sigma_y$ can be defined by a variable "define" and stored in a glbl.v file. The value of "define" can be assigned according to factors such as application scenarios, image preprocessing, raw data (Raw Data) and the like.

The preset base bit width of the base register can be defined as a variable "Wreg" and stored in the glbl.v file. The value of "Wreg" can be 4, 8, 12 or 16 bits, and the specific value depends on requirements on the precision in the actual adjustment.

In the embodiment of the present disclosure, the second number may be 1, and the second precision may be $2^{Wreg}$.

The embodiment of the present disclosure performs the parameter setting of the basic register based on the variables, and can satisfy different application scenarios by modifying the variables, without changing bottom programs and recompiling codes, thereby reducing a development cycle.

For example, the number of base registers in the first cascaded register is greater than the number of base registers in the second cascaded register, i.e., the first number is greater than the second number. When the second number is 1, the variable "k" is greater than 1.

Therefore, after the operation, the first precision $2^{(k \times Wreg)}$ for the gazed area is much larger than the second precision $2^{Wreg}$ for the un-gazed area, thereby improving a visual experience of the user in the gazed area. At the same time, the adjustment is performed on the un-gazed area with a lower precision without affecting the user's viewing, which is facilitated in reducing power consumption.

Further, according to an embodiment of the present disclosure, in the backlight adjustment processing, the current values applied to the backlight elements for different areas can be adjusted with different precision by outputting register values from different cascaded registers. Brightness adjustments with different precisions as described above can be implemented more simply by using different cascaded registers. For example, the precision can be improved by the cascading or splicing of the base registers. With cascading or splicing one more register, the precision will be improved by $2^{Wreg}$.

A method of scanning the at least one of backlight element for the gazed area and the at least one of backlight element for the un-gazed area based on flags according to an embodiment of the present disclosure will be described in detail hereinafter. In the following examples, the backlight partition corresponding to the first matrix described above is taken as an example for description. The method can include a pre-processing step and a scanning step.

First, the pre-processing steps before scanning are described.

The sub-display area corresponding to the backlight partition from the first row to the $m_1^{th}$ row in the first matrix is used as a first un-gazed area (i.e., the un-gazed area previous the gazed area), the sub-display area corresponding to the backlight partition from the $(m_1+1)^{th}$ row to the $(m_1+m_2)^{th}$ row in the first matrix is used as the gazed area, and the sub-display area corresponding to the backlight partition from the $(m_1+m_2+1)^{th}$ row to the $(m_1+m_2+m_3)^{th}$ row (i.e. the $m^{th}$ row) in the first matrix is used as a second un-gazed area (i.e., the un-gazed area after the gazed area).

For example, in the process of scanning the entire backlight area, at least one counter is used for counting, instead of traditional vertical synchronization (V-SYNC) and horizontal synchronization (H-SYNC). By controlling the count of the at least one counter, it is possible to control the switching of status of the flags. Thus, it is possible to convert sets of complex timing into a combination of combination logics (LUT) and timing resource (REG). On the basis of ensuring program convergence, the flow can be further simplified. Meanwhile, a path delay is decreased, and an algorithm complexity is reduced. Further, power consumption and the pressure on the heat dissipation can also be reduced. Thus, this will reserve timing margin for function invoking and subsequent algorithm addition, simplifying the maintenance of programs.

According to an embodiment of the present disclosure, at least one counter may adopt an ascending counting (i.e., a cumulative counting) manner, and may also adopt a descending counting manner. When there are more than one counter, different counters may adopt the same counting manner or different counting manners.

For example, the first counter, the second counter, and the third counter are used to control the corresponding flag respectively. The counter value of the first counter, the counter value of the second counter and the counter value of the third counter may be represented by the count variables "cnt1", "cnt2", and "cnt3", respectively, whose initial values are respectively set as follows: the initial value of the "cnt1" is set to the number of backlight elements for first un-gazed area, that is, the initial value of "cnt1"=$m_1 \times n$; the initial values of "cnt2" and "cnt3" are both set to zero. The first counter adopts a descending counting manner, that is, every time the clock CLK takes effect, "cnt1" is decremented by 1. The second counter and the third counter adopt an ascending counting manner, that is, each time CLK takes effect, both "cnt2" and "cnt3" are incremented by 1. At the same time, each time CLK takes effect, scanning of a backlight element is completed.

Figure 2:
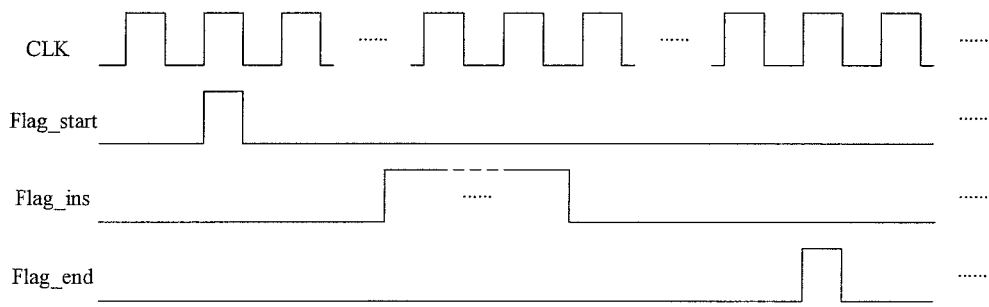
FIG. 2 shows a waveform diagram illustrating a process of changing a flag in the method for adjusting backlight according to an embodiment of the present disclosure.

Referring to FIG. 2, the embodiment of the present disclosure sets a first flag Flag_start, a second flag Flag_ins, and a third flag Flag_end to control the direction and order of scanning. Each of the three flags has two statuses, i.e. a first status and a second status. The first status can be represented by 1, and the second status can be represented by 0. The first flag Flag_start may be an enabling signal for controlling a start of the scanning step, the third flag Flag_end is an ending signal for controlling an end of the scanning step, and the second flag Flag_ins is an enabling signal of the gazed area, so as to control the scanning of the gazed area.

According to an embodiment of the present disclosure, the initial status of the first flag Flag_start is set to the second status. In response to the gazed point being determined, a trigger signal is issued. Then, the first flag Flag_start is set to the first status, that is, Flag_start=1. Thereafter the scanning process starts.

Figure 3:
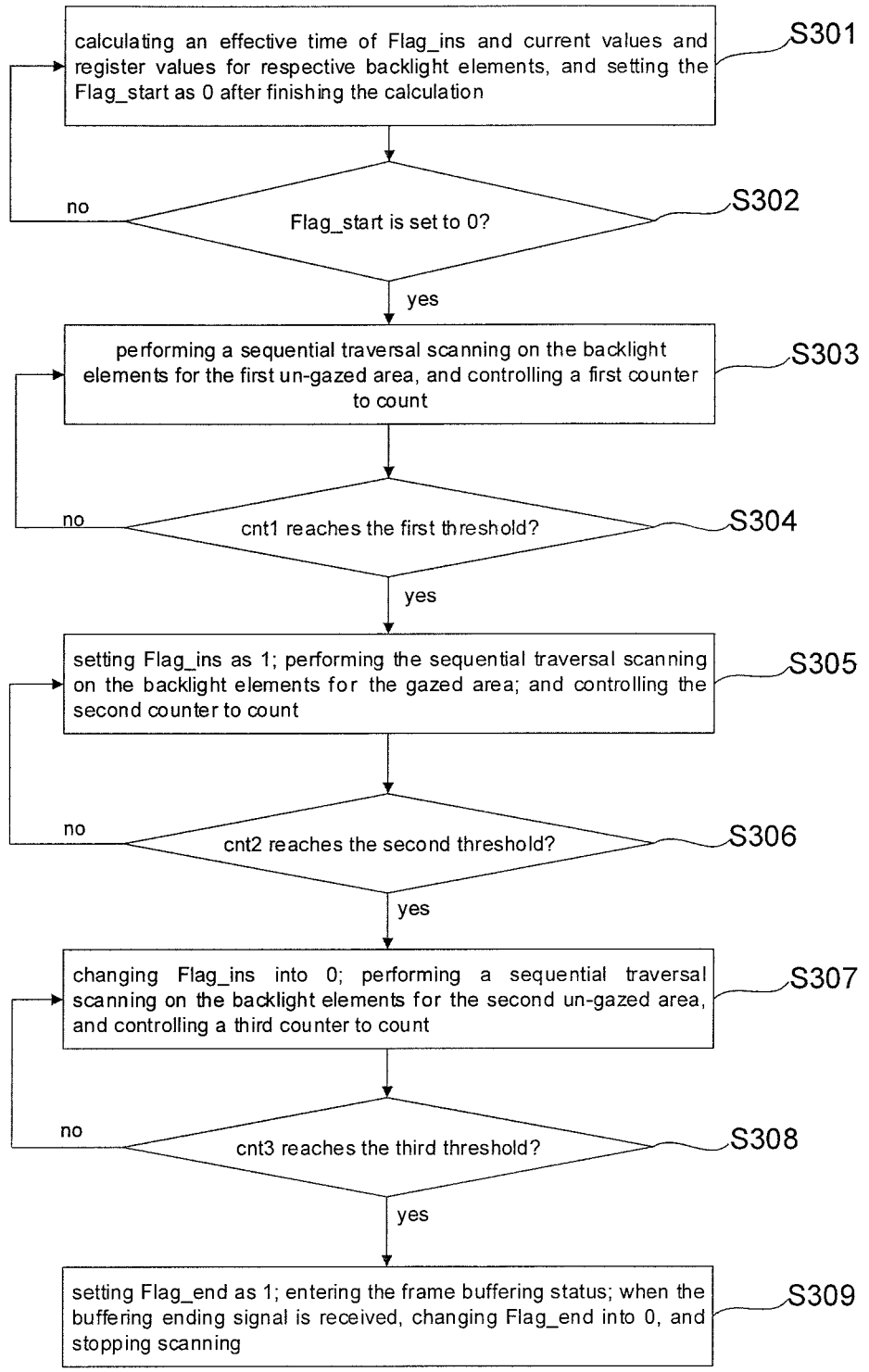
FIG. 3 shows a schematic flow chart illustrating a process of scanning a gazed area and an un-gazed area in the method for adjusting backlight according to an embodiment of the present disclosure.

The method of scanning the at least one backlight element for the gazed area and the at least one backlight element for the un-gazed area based on flags will be described below. As shown in FIG. 3, the method of scanning according to an embodiment of the present disclosure may include the following steps.

In step S301, in response to the first flag Flag_start being set to the first status, an effective time of the second flag Flag_ins is calculated according to the area radius of the gazed area. The current value and register value required for each backlight element are calculated according to the requirements of the displayed image. In response to completing the calculation, the first flag Flag_start is changed to the second status.

In step S302, it is determined that whether the first flag Flag_start is in the second status or not. If so, the method goes into step S303, otherwise, into step S301.

In step S303, sequential traversal scanning is performed on the at least one backlight element for the first un-gazed area previous the gazed area, and the first counter is controlled to start counting.

In step S304, it is determined whether the first count value "cnt1" of the first counter reaches a first threshold. If so, step S305 is performed, otherwise step S303 is performed. The absolute value of a difference between the initial value of "cnt1" and the first threshold (i.e., the total count of the first counter) is equal to the number of the backlight elements for the first un-gazed area, i.e. $m_1 \times n$. When "cnt1" reaches the first threshold, it indicates that the scanning of the first un-gazed area is completed. For example, the first threshold can be set to zero.

In step S305, the counting is finished, and the second flag Flag_ins is set to the first status (for example, 0), so as to stop the current traversal scanning. The sequential traversal scanning on the at least one backlight element for the gazed area is started, and the second counter is controlled to start counting.

In step S306, it is determined that whether the second count value "cnt2" of the second counter reaches the second threshold. If yes, step S307 is performed, otherwise step S305 is performed. The absolute value of a difference between the initial value of "cnt2" and the second threshold (i.e., the total count of the second counter) is equal to the number of the backlight elements for the gazed area, i.e. $m_2 \times n$. If the gazed area is the backlight area corresponding to the second matrix, the second threshold can be set to $(2\sigma_x+1) \times (2\sigma_y+1)$. When the count value "cnt2" reaches the second threshold, it indicates that the scanning on the gazed area is completed.

In step S307, the second counter finishes counting, the second flag Flag_ins is changed from the first status to the second status, and the current traversal scanning is also stopped. A sequential traversal scanning is started on the at least one backlight element for the second un-gazed area after the gazed area, and the third counter is controlled to start counting.

In step S308, it is determined whether the third count value cnt3 of the third counter reaches the third threshold. If yes, step S309 is performed, otherwise step S307 is performed. The absolute value of a difference between the initial value of "cnt3" and the third threshold (i.e., the total count of the third counter) is equal to the number of the backlight elements for the entire display area (including the first un-gazed area, the gazed area and the second un-gazed area), i.e. $m \times n$. When the count value "cnt3" of the third counter reaches the third threshold, it indicates that the scanning of the second un-gazed area is completed. For example, the third threshold can be set to $m \times n$.

In step S309, the third counter finishes counting, the third flag Flag_end is set to the first status, and the process goes into a frame buffering state. When a buffering ending signal is received, Flag_end changes from the first status to the second status, ending the current traversal scanning.

It should understood by those skilled in the art that each of the backlight elements for respective area in the embodiment of the present disclosure may be sequentially arranged regardless of pixel rows and columns in visual. During the scanning process, it is not necessary to add the traditional row and frame flags. With the changing of for example several flag bits, it is possible to control the start and end of scanning for different areas. This can realize an accurate and simple scanning control. In addition, parallel operations can be simplified as a serial operation, thereby simplifying timing.

According to the method for adjusting backlight of the embodiment of the present disclosure, step S102 may further comprise: determining whether the gazed point of the user on the displayed image is acquired or not; determining the gazed area and the un-gazed area for the displayed image according to a preset position on the displayed image, in response to determining that the gazed point is not acquired; or treating the displayed image as the gazed area. The adjustment on the gazed area or un-gazed area determined in this way can be referred to the examples above.

According to an embodiment of the present disclosure, the preset position may be a golden section ratio of the displayed image. The preset position can also be set to other positions according to actual needs.

According to the embodiment of the present disclosure, the gazed area and the un-gazed area can be determined regardless of whether the gazed point is acquired, so that the brightness adjustment of the backlight on the entire backlight area can be continuously performed, avoiding an interruption of the adjustment due to an error of the tracking algorithm.

Figure 4:
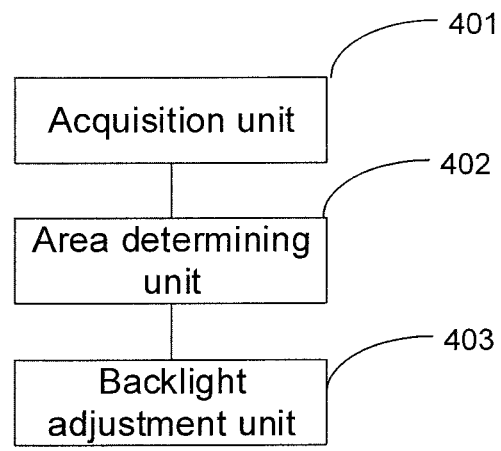
FIG. 4 shows a schematic structural view illustrating a device for adjusting backlight according to an embodiment of the present disclosure.

Embodiments of the present disclosure also provide a device for adjusting backlight of the display device. As shown in FIG. 4, the device for adjusting backlight may include an acquisition unit 401, an area determining unit 402 and a backlight adjustment unit 403.

The acquisition unit 401 is configured to acquire a displayed image for the display device and a gazed point of the user on the displayed image.

The area determining unit 402 is configured to determine a gazed area and an un-gazed area for a displayed image according to the gazed point.

The backlight adjustment unit 403 is configured to adjust a brightness of the backlight for the gazed area determined by the area determining unit with a first precision, and adjust the brightness of the backlight for the un-gazed area determined by the area determining unit with a second precision.

The area determining unit 402 is further configured to acquire the un-gazed point by an eye tracking algorithm or a gaze tracking algorithm dynamically.

The area determining unit 402 is further configured to: determine whether the gazed point of the user on the displayed image is acquired or not; determine the gazed area and the un-gazed area for the displayed image according to a preset position on the displayed image, in response to determining that the gazed point is not acquired; or treat the displayed image as the gazed area.

The backlight adjustment unit 403 can also be configured to scan at least one backlight element for the gazed area and at least one backlight element for the un-gazed area in a set direction. For example, in response to the gazed point being acquired, the first flag is set to the first status. In response to a first flag being changed from a first status to a second status, a sequential traversal scanning is performed on the at least one backlight elements for the un-gazed area previous the gazed area in terms of position, until a second flag is set to the first status. In response to the second flag being set to the first status, the sequential traversal scanning is performed on the at least one backlight element for the gazed area, until the second flag is changed from the first status to the second status. In response to the second flag being changed from the first status to the second status, the sequential traversal scanning is performed on the at least one backlight element for the un-gazed area after the gazed area, until a third flag is set to the first status The backlight adjustment unit 403 can also be configured to adjust a current value applied to the at least one backlight element for the gazed area with the first precision, in response to the gazed area being scanned by a scanning unit.

The backlight adjustment unit 403 can also be configured to adjust a current value applied to the at least one backlight element for the un-gazed area with the second precision, in response to the un-gazed area being scanned by the scanning unit.

The backlight adjustment unit 403 can also be used to:

control, in response to the first flag being changed from the first status to the second status, a first counter to count until a count value of the first counter reaches a first threshold, and set the second flag to the first status;

control, in response to the second flag being set to the first status, a second counter to count until a count value of the second counter reaches a second threshold, and change the second flag from the first status to the second status.

control, in response to the second flag being changed from the first status to the second status, a third counter to count until a count value of the third counter reaches a third threshold, and set the third flag to the first status.

The description of the device for adjusting backlight according to the embodiment of the present disclosure can be made reference with the description of the method for adjusting backlight. The device for adjusting backlight according to the embodiment of the present disclosure may have the same effects as those of the method for adjusting backlight, which are not described herein again.

Figure 5:
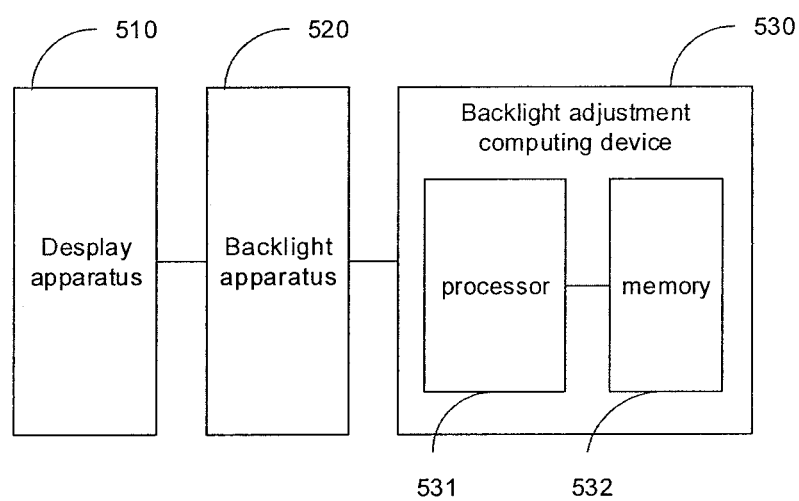
FIG. 5 shows a schematic structural diagram illustrating a display device according to an embodiment of the present disclosure.

The embodiments of the present disclosure further provide a display device. FIG. 5 shows a schematic structure of the display device, which may comprise a display apparatus 510, a backlight apparatus 520, and a backlight adjustment computing device 530, which are electrically coupled. The display apparatus 510 is configured to display an image; the backlight apparatus 520 is configured to provide a backlight source for the display apparatus 510. The backlight adjustment computing device 530 is configured to perform the method for adjusting backlight according to any of embodiments of the present disclosure.

The backlight apparatus 520 may include a plurality of backlight elements, and at least a portion of the backlight elements are disposed at an edge area of the backlight apparatus 520. The edge area includes at least a backlight area corresponding to the first row, the first column, the $m^{th}$ row, and the $n^{th}$ column in the first matrix.

When the edge area has a distortion, the contrast of the edge area with respect to other areas can be reduced by configuring the current value applied to the backlight elements in the edge area. This may optimize an anti-distortion operation in combination with the upper layer Software Development Kit (SDK). When the display device is applied to a VR or AR system, it is also possible to reduce or even eliminate a problematic area which is occurred after being lens enlarged due to an error in a conventional process, by adjusting a current value applied to the backlight element in the edge area, thereby improving a yield of a product.

Configuration of the current value applied to the backlight element in the edge area according to the embodiment of the present disclosure may be made reference to the method for adjusting backlight described above.

The backlight adjustment computing device 530 can include at least one processor 531 and a memory 532, wherein the at least one processor 531 is electrically coupled to the memory 532. The memory 532 is configured to store at least one executable instruction, and the at least one processor 531 is configured to execute the at least one executable instruction, so as to perform the method for adjusting backlight according to the embodiments of the present disclosure.

The processor 531 may be a Digital Signal Processor (DSP), a Field-Programmable Gate Array (FPGA), or other devices with logic processing capability, such as a Microcontroller Unit (MCU), a Central Process Unit (CPU).

Embodiments of the present disclosure also provide a computer readable storage medium storing a computer program that, when executed, implements the method for adjusting backlight according to the embodiments of the present disclosure.

The computer readable storage medium according to the embodiments of the present disclosure includes, but is not limited to, any type of disk (including a floppy disk, a hard disk, an optical disk, a CD-ROM, and a magneto-optical disk), a Read-Only Memory (ROM), a Random Access Memory (RAM), an Erasable Programmable Read-Only Memory (EPROM), an Electrically Erasable Programmable Read-Only Memory (EEPROM), a Flash Memory, a Magnetic Card or an optical card. That is, the readable storage medium comprises any medium that stores or transmits information readable by a device (e.g., a computer).

According to the technical solutions of the embodiments of the present disclosure, it is capable of determining an actual gazed area of the user according to the actual gazed point of the user on the image, rather than only focusing on a fixed gazed area. This may conform to the user's gaze in an actual use better, and improve a visual experience of the user. In addition, this enables adjusting the current values applied to the backlight elements for the gazed area and the un-gazed area with different precisions, so that the image contrast for the gazed area is made to be relatively large, enabling the render of the image being more delicate and vivid. Meanwhile, the image contrast for the un-gazed area is made to be relatively small, reducing the calculation amount and the control amount of the associated parameters and simplifying the control process. This may reduce the power consumption required for controlling while satisfying the user's demand. Further, it is also capable of adjusting the precision level more simply by cascading different numbers of base registers, thereby achieving a precise management of the backlight and making the backlight structure compatible; using variables to manage the codes, i.e. only the variables are required to be modified for different application scenarios. That is to say, there is no need to modify the bottom program, greatly shortening the development cycle; using the flag and the count variable to control the scanning process, which can simplify the operation, reduce the path delay, reduce the complexity of the algorithm, ensure a low-power heat dissipation, reserve the timing margin for the function call and addition of the new algorithm, and facilitate program maintenance; and covering the edge area of the backlight area by the brightness adjustment of the backlight area, which can reduce the probability of distortion and improve product quality.

Those skilled in the art will appreciate that each of the structural diagrams and/or block diagrams and/or flow diagrams and combinations of the structural diagrams and/or block diagrams and/or flow diagrams can be implemented with computer program instructions. Those skilled in the art will appreciate that these computer program instructions can be implemented by a general purpose computer, a professional computer, or a processor of other programmable data processing methods, such that schemes specified in one or more of the disclosed structural diagrams and/or block diagrams and/or flow diagrams according to the embodiments of the present disclosure can be implemented by the computer or the processor of other programmable data processing methods.

Those skilled in the art can understand that the various operations, methods, and steps, measures, and solutions in the present disclosure may be alternated, modified, combined, or deleted. Further, other steps, measures, and aspects of the various operations, methods, and processes that have been discussed in this disclosure may be alternated, modified, rearranged, decomposed, combined, or deleted. Further, the steps, measures, and solutions in the prior art having various operations, methods, and processes disclosed in the present disclosure may also be alternated, modified, rearranged, decomposed, combined, or deleted.

The above description is only partial embodiments of the present disclosure. It should be noted that those skilled in the art can also make several improvements and modifications without departing from the principles of the present disclosure. Such improvements and modifications should also be considered as being within the scope of this disclosure.

We claim:

1. A method for adjusting backlight of a display device, comprising:
   acquiring a displayed image of the display device;
   acquiring a gazed point of a user on the displayed image;
   determining a gazed area and an un-gazed area for the displayed image according to the gazed point;
   adjusting a brightness of the backlight for the gazed area with a first precision; and
   adjusting the brightness of the backlight for the un-gazed area with a second precision;
   wherein the display device comprises a backlight apparatus comprising a plurality of backlight elements, and
   wherein the adjusting the brightness of the backlight for the gazed area with the first precision comprises: scanning at least one backlight element for the gazed area among the plurality of backlight elements in a set direction; and adjusting a current value applied to the at least one backlight element for the gazed area with the first precision, and
   wherein the adjusting the brightness of the backlight for the un-gazed area with the second precision comprises: scanning at least one backlight element for the un-gazed area among the plurality of backlight elements in the set direction; and adjusting the current value applied to the at least one backlight element for the un-gazed area with the second precision;
   wherein the method further comprising:
   setting a first flag to a first status, in response to the gazed point being acquired; and
   performing, in response to the first flag being changed from the first status to a second status, a sequential traversal scanning on the at least one backlight element for the un-gazed area previous the gazed area in terms of position, until a second flag is set to the first status;
   performing, in response to the second flag being set to the first status, the sequential traversal scanning on the at least one backlight element for the gazed area, until the second flag is changed from the first status to the second status; and
   performing, in response to the second flag being changed from the first status to the second status, the sequential traversal scanning on the at least one backlight element for the un-gazed area behind the gazed area in terms of position, until a third flag is set to the first status.

2. The method of claim 1, wherein adjusting the current value applied to the at least one backlight element for the gazed area with the first precision comprises:
   adjusting, for each of the at least one backlight element for the gazed area, a register value corresponding to the backlight element stored in a first cascaded register, and outputting an adjusted register value;
wherein adjusting the current value applied to the at least one backlight element for the un-gazed area with the second precision comprises:
   adjusting, for each of the at least one the backlight element for the un-gazed area, the register value corresponding to the backlight element stored in a second cascaded register, and outputting an adjusted register value.

3. The method of claim 1, further comprising:
   cascading a first number of base registers to form the first cascaded register according to a preset maximum cascading number, a bit width, and an actual cascading number of the base registers, in response to an actual cascading number of the base registers being the first number; and
   cascading a second number of base registers to form the second cascaded register according to a preset maximum cascading number, a bit width, and the actual cascading number of the base registers, in response to the actual cascading number of the base registers being the second number.

4. The method of claim 1, further comprising:
   acquiring the un-gazed area by an eye tracking algorithm or a gaze tracking algorithm dynamically.

5. The method of claim 1, wherein acquiring the gazed point of a user on the displayed image comprises:
   determining whether the gazed point of the user on the displayed image is acquired or not;
   determining the gazed area and the un-gazed area for the displayed image according to a preset position on the displayed image, in response to determining that the gazed point is not acquired.

6. The method of claim 1, further comprising:
   controlling, in response to the first flag being changed from the first status to the second status, a first counter to count until a count value of the first counter reaches a first threshold, and setting the second flag to the first status;
   controlling, in response to the second flag being set to the first status, a second counter to count until a count value of the second counter reaches a second threshold, and changing the second flag from the first status to the second status; and
   controlling, in response to the second flag being changed from the first status to the second status, a third counter to count until a count value of the third counter reaches a third threshold, and setting the third flag to the first status.

7. The method of claim 1, wherein acquiring the gazed point of the user on the displayed image comprises:
   determining whether the gazed point of the user on the displayed image is acquired or not; and
   treating the displayed image as the gazed area, in response to determining that the gazed point is not acquired.

8. A backlight adjustment device, comprising:
   a memory, configured to store computer executable instructions; and
   at least one processor, configured to execute the computer executable instructions so as to acquire a displayed image of the display device;
   acquire a gazed point of a user on the displayed image;
   determine a gazed area and an un-gazed area for the displayed image according to the gazed point;
   scan at least one backlight element for the gazed area among the plurality of backlight elements in a set direction;

adjust a current value applied to the at least one backlight element for the gazed area with the first precision, scan at least one backlight element for the un-gazed area among the plurality of backlight elements in the set direction; and adjust the current value applied to the at least one backlight element for the un-gazed area with the second precision;

set a first flag to a first status, in response to the gazed point being acquired;

perform, in response to a first flag being changed from the first status to a second status, a sequential traversal scanning on the at least one backlight element for the un-gazed area previous the gazed area in terms of position, until a second flag is set to the first status;

perform, in response to the second flag being set to the first status, the sequential traversal scanning on the at least one backlight element for the gazed area, until the second flag is changed from the first status to the second status; and perform, in response to the second flag being changed from the first status to the second status, the sequential traversal scanning on the at least one backlight element for the un-gazed area behind the gazed area in terms of position, until a third flag is set to the first status.

9. A display device comprising a display apparatus, a backlight apparatus, and a backlight adjustment computing device of claim 8 which are electrically coupled.

10. The device of claim 9, wherein the backlight apparatus comprises a plurality of backlight elements, wherein at least a portion of the plurality of backlight elements are disposed at an edge area of the backlight apparatus.

11. A non-transitory computer readable storage medium storing a computer program, the computer program being executed to acquire a displayed image of the display device;

acquire a gazed point of a user on the displayed image;

determine a gazed area and an un-gazed area for the displayed image according to the gazed point;

scan at least one backlight element for the gazed area among the plurality of backlight elements in a set direction;

adjust a current value applied to the at least one backlight element for the gazed area with the first precision, scan at least one backlight element for the un-gazed area among the plurality of backlight elements in the set direction;

adjust the current value applied to the at least one backlight element for the un-gazed area with the second precision;

set a first flag to a first status, in response to the gazed point being acquired;

perform, in response to a first flag being changed from the first status to a second status, a sequential traversal scanning on the at least one backlight element for the un-gazed area previous the gazed area in terms of position, until a second flag is set to the first status;

perform, in response to the second flag being set to the first status, the sequential traversal scanning on the at least one backlight element for the gazed area, until the second flag is charged from the first status to the second status; and perform, in response to the second flag being changed from the first status to the second status, the sequential traversal scanning on the at least one backlight element for the un-gazed area behind the gazed area in terms of position, until a third flag is set to the first status.

* * * * *